(12) United States Patent
Hilton et al.

(10) Patent No.: US 7,310,298 B2
(45) Date of Patent: Dec. 18, 2007

(54) STORAGE DEVICE HAVING A PROBE TO FORM STRUCTURES FOR REPRESENTING DATA STATES

(75) Inventors: Richard L Hilton, Boise, ID (US); Kenneth J. Eldredge, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 597 days.

(21) Appl. No.: 10/849,752

(22) Filed: May 20, 2004

(65) Prior Publication Data

US 2005/0259503 A1  Nov. 24, 2005

(51) Int. Cl.
G11B 7/00 (2006.01)
(52) U.S. Cl. ...................................... 369/126
(58) Field of Classification Search ............... 369/126, 369/103, 275.3; 702/33
See application file for complete search history.

(56) References Cited

U.S. PATENT DOCUMENTS

| | | | |
|---|---|---|---|
| 5,345,815 A | 9/1994 | Albrecht et al. | |
| 5,835,477 A | 11/1998 | Binnig et al. | |
| 5,856,967 A | 1/1999 | Mamin et al. | |
| 6,233,206 B1 | 5/2001 | Hamann et al. | |
| 6,249,747 B1 * | 6/2001 | Binnig et al. | ............... 702/33 |
| 6,370,107 B1 | 4/2002 | Hosaka et al. | |
| 6,473,361 B1 | 10/2002 | Chen et al. | |

OTHER PUBLICATIONS

Vettiger and Binnig, Scientific American, "The Nanodrive Project," pp. 47-51, 53 (Jan. 2003).

* cited by examiner

*Primary Examiner*—Nabil Hindi

(57) ABSTRACT

A storage device includes a probe and a storage medium having a plurality of storage cells. The probe is able to form a first structure and a second structure in the storage medium, where a first storage cell containing a transition between the first structure and a second structure contains a data bit having a first state, and where a second storage cell not including a transition between the first structure and the second structure contains a data bit having a second state.

20 Claims, 5 Drawing Sheets

STORAGE DEVICE HAVING A PROBE TO FORM STRUCTURES FOR REPRESENTING DATA STATES

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device (referred to as a "probe-based storage device") is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0."

One of the issues associated with a probe-based storage device is the density of data bits that can be stored on the storage device. To enable meaningful storage of data bits in adjacent storage cells defined on a storage medium of a probe-based storage device, a minimum pitch is typically defined between adjacent storage cells. The minimum pitch defines a minimum distance between storage cells so that a dent formed in a first storage cell does not encroach into a neighboring storage cell. Overlapping of a dent into a neighboring storage cell can result in inaccurate detection of data. The minimum pitch specified between storage cells of a probe-based storage device prevents a higher storage density from being achieved, which can lead to higher cost per bit of data.

DETAILED DESCRIPTION

Figure 1:
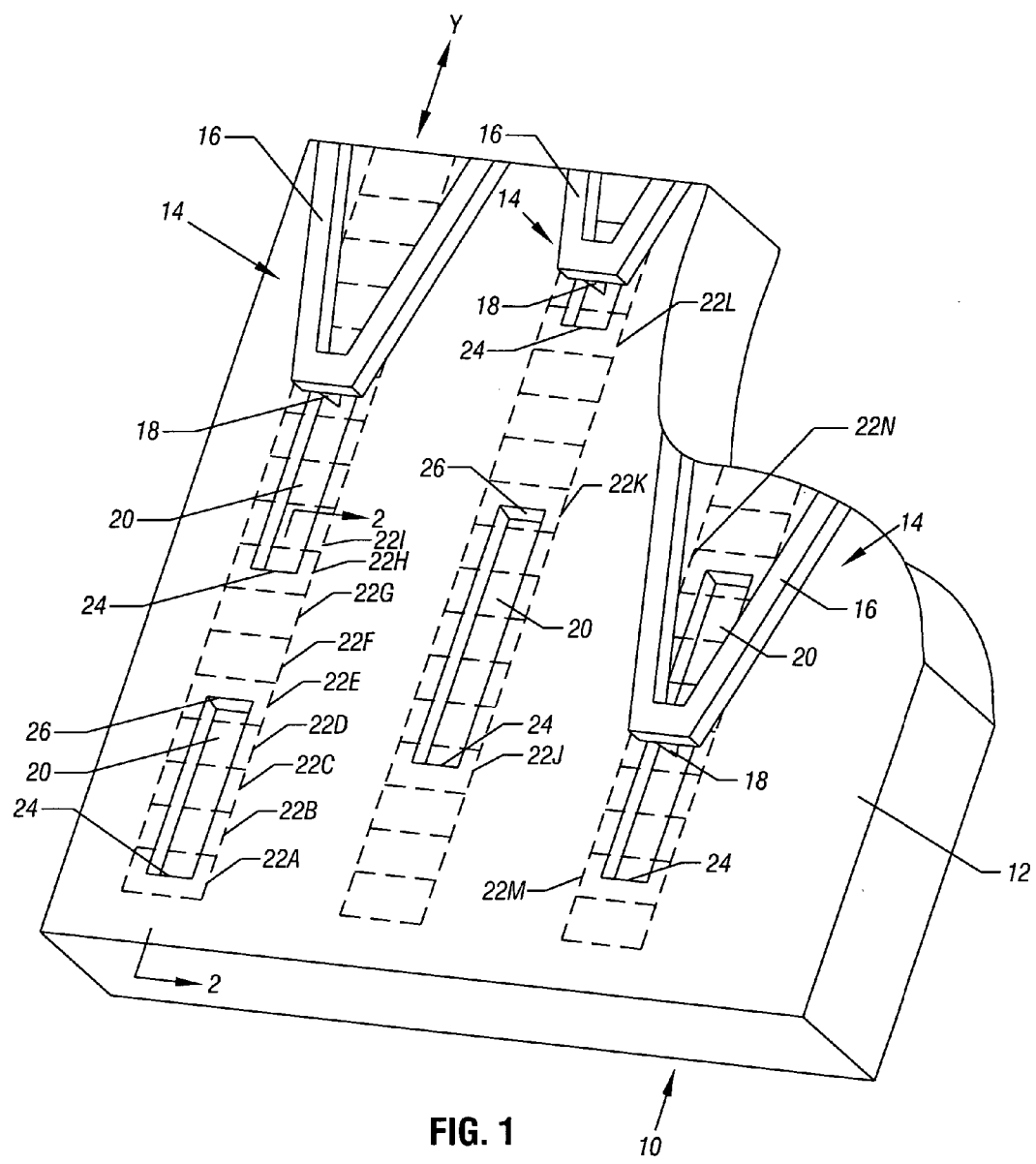
FIG. 1 illustrates a probe-based storage device having a storage medium in which variable length trenches can be formed, in accordance of some embodiments of the invention.

FIG. 1 shows an example probe-based storage device that includes a storage substrate 10 that provides a storage medium. As used here, the term "storage medium" refers to any medium in which storage cells are capable of being formed. The storage medium can make up a portion of the storage substrate 10, or the storage medium can be considered to be the whole storage substrate 10.

In accordance with some embodiments of the invention, the storage medium has a storage surface 12 on which variable length trenches 20 can be formed by tips 18 of respective probes 14. The tip 18 of each probe 14 is attached to and extends outwardly from a cantilever 16 of the probe 14. According to some embodiments, each probe 14 is a very small probe (on the order of micrometers, nanometers, or even smaller) that is built using nanotechnology techniques. Such a probe is referred to as a microscopic probe or nanotechnology probe.

Storage cells 22 (represented by dashed boxes in FIG. 1) are defined in the storage medium. In FIG. 1, storage cells 22A-22N are labeled. In accordance with some embodiments of the invention, instead of representing storage states with individual dents or pits formed in the storage medium, variable length trenches 20 are formed instead. Conventionally, the presence of a dent or pit represents a first storage state, while the absence of a dent or pit represents a second storage state. However, according to some embodiments of the invention, the transition between a trench 20 and the storage surface 12 represents a first storage state, whereas lack of a transition between a trench 20 and the storage surface 12 represents a second storage state. As depicted in FIG. 1, each trench 20 has four sides, including two sides that are generally parallel to a direction of movement (along the Y axis) of each probe 14, and a first end 24 and a second end 26 that cross the direction of movement of each probe 14 (the Y access). As used here, the terms "first end" and "second end" of a trench refer to the ends of each trench that cross the direction of movement of a probe 14. Movement of the probe 14 relative to the storage medium can be accomplished in one of several ways: (1) move the storage medium while the probe 14 remains stationary; (2) move the probe 14 while the storage medium remains stationary; and (3) move both the probe 14 and the storage medium.

Each of the first end 24 and second end 26 represents a transition between a trench 20 and the storage surface 12. The presence of a transition in a storage cell 22 means that the storage cell contains a data bit having a first storage state. On the other hand, lack of a transition (lack of a first end 24 or lack of a second end 26) in a storage cell means that the storage cell contains a data bit having a second storage state. For example, the first storage state is a logical "1" and the second storage state is a logical "0," or vice versa. Thus, in the example of FIG. 1, the storage cell 22A includes the first end 24 of a trench 20, and thus the store cell 22A is considered to store a data bit having the first storage state. Similarly, the storage cell 22E contains the second end 26 of a trench 20, and is thus also considered to store a data bit having the first storage state.

On the other hand, storage cells 22B, 22C, and 22D are located at regions of the storage medium that contain a portion of the trench 20 (but not a first or second end of the trench). Therefore, storage cells 22B-22D are considered to store data bits each having the second storage state. Similarly, storage cells 22F and 22G also are considered to store data bits having the second storage state, since storage cells 22F and 22G are located at regions of the storage medium that also do not contain a transition between a trench 20 and the storage surface 12. Storage cells 22F and 22G are located at regions of the storage medium that contain respective portions of the storage surface 12. Other storage cells in FIG. 1 that contain transitions (either a first end 24 or a second end 26 of a trench 20) are storage cells 22H, 22J, 22K, 22L, 22M, and 22N. The remaining storage cells shown in FIG. 1 either contain respective portions of a trench 20 (away from the first and second ends of a trench 20), or respective portions of the storage surface 12.

By employing a transition (or lack of a transition) between a trench 20 and the storage surface 12 to indicate a first (or second) storage state, the effective minimum pitch between storage cells 22 can be reduced as compared to conventional probe-based storage devices in which the presence of a dent represents one state while the absence of a dent represents another state. The reduced minimum pitch is achieved by the fact that overlapping of a dent in a first storage cell into a neighboring storage cell is no longer a concern, since transitions between structures on the storage medium (a trench 20 and the storage surface 12) provide the indication of storage states.

Figure 6A:
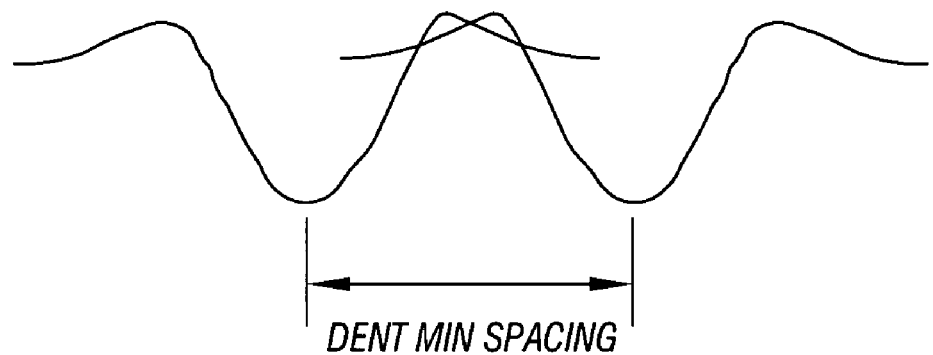
FIG. 6A illustrates minimum dent spacing in accordance with an embodiment of the present invention.
Figure 6B:
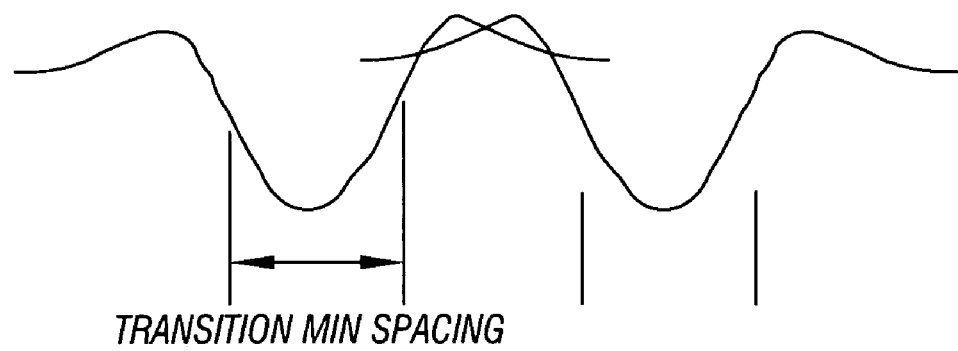
FIG. 6B illustrates minimum transition spacing in accordance with an embodiment of the present invention.

If conventional dents are used to represent data states, then the minimum dent spacing is as illustrated in FIG. 6A. However, if transitions are used to indicate data states, then the minimum spacing can be smaller even though the size of the minimum dent remains the same, as shown in FIG. 6B.

Figure 2:
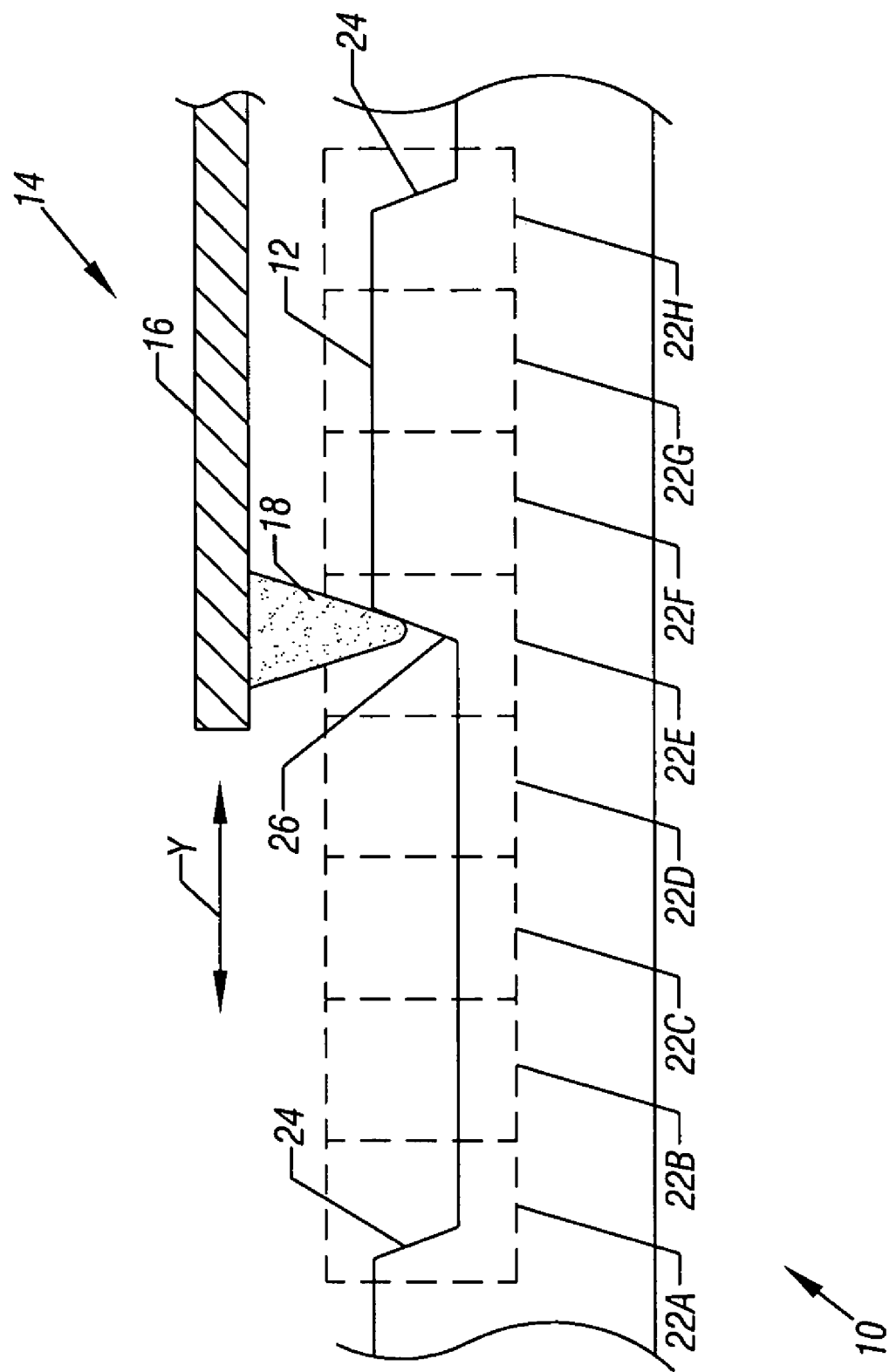
FIG. 2 is a cross-sectional view of a portion of the probe-based storage device of FIG. 1.

FIG. 2 shows a cross-sectional view of a portion of the probe-based storage device of FIG. 1. As shown in FIG. 2, a probe 14 is moveable with respect to the storage medium in a direction indicated by Y. As the probe 14 is moved relative to the storage medium, the tip 18 of the probe 14 detects transitions (either a first end 24 or a second end 26) of a trench 20. Detection of whether the probe 14 is in a trench 20 or on the storage surface 12 can be accomplished in a number of different ways. For example, when the tip 18 is engaged inside a trench 20, the probe 14 is brought into closer proximity of the storage medium. If the probe 14 is heated (such as by running an electrical current through the cantilever 16 of the probe 14), then the closer proximity to the probe 14 to the storage medium enables more heat to radiate from the cantilever 16 to the storage medium. This radiation causes the temperature of the probe 14 to be lower than if the tip 18 of the probe 14 is engaged on the storage surface 12 such that a greater distance exists between the cantilever 16 and the storage medium. Thus, as the probe tip 18 moves in the Y direction, the temperature of the probe 14 fluctuates between a first temperature (in response to the probe tip 18 being engaged in the trench 20) and a second temperature (in response to the probe tip 18 being engaged on the storage surface 12 but not in the trench 20). The change in temperature of the probe 14 results in a change in resistance of the cantilever 16 (formed of an electrically conductive material) of the probe. This change in resistance in the cantilever 16 is detected by peripheral circuitry of the probe-based storage device to determine when the probe tip 18 has encountered a transition.

In another implementation, a piezoresistive element can be provided on the cantilever 16 of the probe 14 to detect deflection of the probe 14. If the probe is engaged in a trench 20, then the cantilever 16 is deflected by a first amount. However, if the probe 14 is not engaged in the trench 20, but rather is engaged on the storage surface 12, then the cantilever 16 of the probe 14 is deflected by a second amount. The change in deflection of the cantilever 16 causes a change in resistance of the piezoresistive element. The change in resistance of the piezoresistive element provides an indication that the probe tip 18 has encountered a transition.

In yet other implementations, a capacitive coupling or magnetic coupling mechanism can be employed to detect whether the probe tip 18 is inside a trench 20 or outside a trench 20. The capacitive or magnetic coupling mechanism provides a variable capacitance or variable magnetorsistance that varies based on whether the tip 18 of the probe 14 is engaged in a trench 20 or on the storage surface 12.

In yet other alternative implementations, the storage medium can be formed of an electrically conductive material. When the probe tip 18 drops into a trench, an electrically conductive part of the probe 14 is electrically contacted to the storage surface 12. The presence of electrical communication between the probe 14 and the storage medium is an indication that the probe tip 18 is inside a trench 20, while lack of electrical communication between the probe 14 and the storage medium is an indication that the probe tip 18 is sitting on the storage surface 12 and not in a trench 20.

To form a trench 20 during a write operation, the probe tip 18 is heated to a predetermined write temperate (e.g., up to 400° C. or greater). As the probe tip 18 is heated, the tip 18 is dragged across the storage medium, with a deflection force applied toward the storage surface 12 of the storage medium. The elevated temperature of the probe tip 18 melts the upper portion of the storage medium such that as the probe 14 is moved relative to the storage medium, a trench 20 is formed. To avoid forming a trench 20, the probe tip 18 is cooled to a temperature less than the predetermined write temperature.

At least a layer (a layer adjacent the storage surface 12) is formed on a relatively soft material to enable the probe tip 18 to form a trench 20 when the probe tip 18 is heated to greater than the predetermined write temperature. An example of such a soft material is polymer (e.g., PMMA or polymethylmethacrylate). Other materials can be used in other embodiments.

The length of each trench 20 is variable and depends on the input data pattern to be stored into the storage cells 22. For example, a stream of input data bits to be stored may be as follows: 10000001. In this case, the length of the trench is defined to store the six "0s" in the stream, with the first end 24 and second end 26 of the trench representing the two "1s." To store another stream, such as 10000000000001, a trench having a second length is formed to store the 12 "0s" in the stream.

To erase a trench 20 (or a portion of the trench), the probe tip 20 is locally heated to melt the material surrounding the trench 20 (or portion of the trench) such that the material flows back into the trench 20 (or portion of the trench). Alternatively, heat sources formed in the substrate 10 can be used to melt material surrounding a trench 20 to erase the trench or trench portion.

Figure 3:
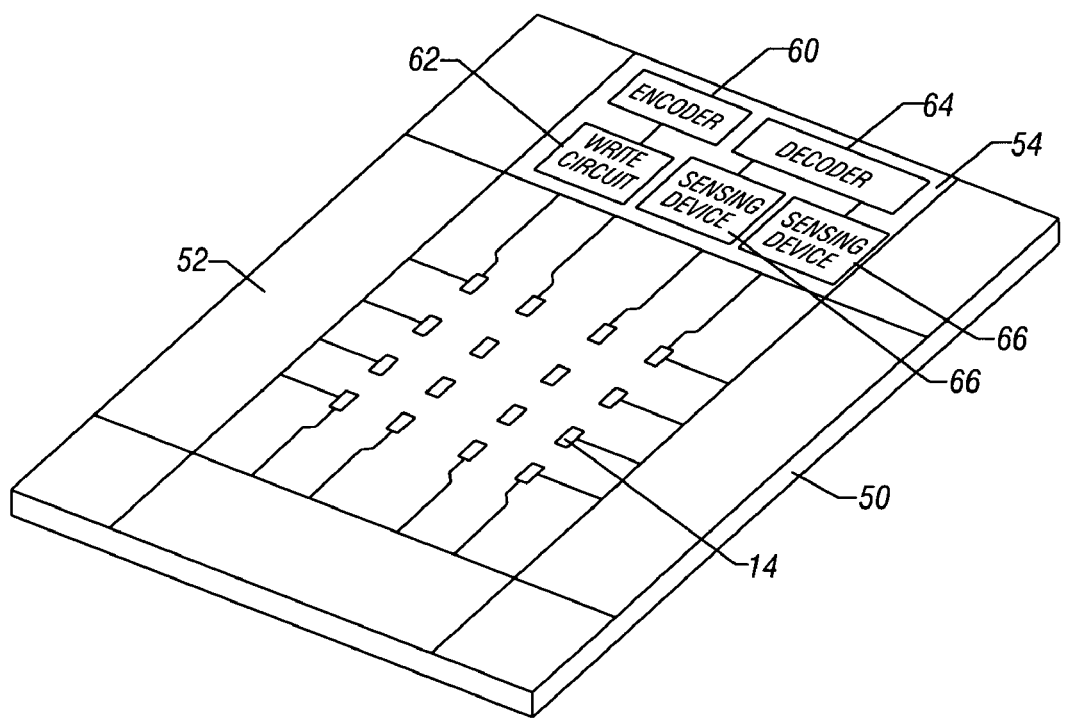
FIG. 3 is a schematic diagram of a probe substrate containing an array of probes and peripheral circuitry to interact with such probes in the probe-based storage device of FIG. 1.

In accordance with some embodiments of the invention, it is desired that the number of transitions between "0s" and "1s" be reduced as much as possible. For example, to store the following data bit pattern, 1010101010, would result in very short-length trenches where the first and second ends 24 and 26 may not be well defined. To reduce occurrences of data streams with many closely spaced transitions between "1s" and "0s," special coding can be applied to input write data to be stored in the storage medium. As shown in FIG. 3, the input write data is applied to an encoder 60, which encodes the input write data to produce output encoded data that is provided to write circuit 62 for writing to storage cells 22 (FIG. 1) using probes 14. Thus, instead of storing input write data directly into storage cells 22 of a storage device, the input write data is first encoded, with the encoded data written to the storage cells 22. The encoded data reduces the number of transitions between "1s" and "0s" such that well defined trenches (and respective first and second ends 24 and 26 of such trenches) can be formed. The net result of encoding the input write data is that the encoded data causes the probes 14 to form trenches each having greater than a predetermined length. The predetermined length is a length defined to assure that well defined trenches are formed such that first and second ends 24 and 26 of each trench can be reliably detected by the probe tip during a read operation.

FIG. 3 also illustrates a probe substrate 50 that includes an array of probes 14 formed in the substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 14 may be activated by the select lines to read from or write to storage cells that the probes are in contact with. This structure enables concurrent access of multiple cells in one operation, which improves access speeds. Alternatively, one of the probes may be activated to read from or write to one storage cell.

The encoder 60 and write circuit 62 are part of the peripheral circuitry 54. Note, however, that the encoder 60 and the write circuit 62 can alternatively be provided in the peripheral circuitry 52. In yet another implementation, the encoder 60 and write circuit 62 are divided into multiple portions that are located in different parts of the peripheral circuitry 52 and 54.

The peripheral circuitry 52 and/or 54 also include sensing devices 66 that are activated during a read operation to detect positions of respective probes 14. Each sensing device produces a first indication to indicate that a probe tip 18 is located in a trench 20, and a second indication to indicate that the probe tip 18 is located on the storage surface 12 but not in a trench 20. A transition is indicated by a change in the output of the sensing device from the first indication to the second indication, or vice versa. The output of each sensing device 66 is provided to a decoder 64. In addition to transforming analog outputs of the sensing devices 66 to digital form, the decoder 64 also decodes the read data retrieved from the storage cells to remove the encoding applied by the encoder 60 during a write operation. Thus, the decoder 64 outputs read data in their original form (prior to encoding). The sensing devices 66 and decoder 64 are part of read circuitry according to one embodiment.

Instead of forming variable-length trenches 20 in the storage medium, other embodiments of the invention can form other structures in the storage medium, where a transition between different structures indicate a first storage state, while lack of a transition indicates a second storage state. Forming such other structures include forming other types of topographic features on the storage medium (e.g., forming a hill or protrusion instead of forming a trench); altering the crystalline phase of the storage medium; filling or emptying existing electronic states of the storage medium; creating or altering domain structures or polarization states in the storage medium; creating or altering chemical bonds in the storage medium; and employing tunneling effects to move and remove atoms or charge to or from the storage medium. Thus, forming a structure involves changing a physical characteristic of the storage medium, changing a chemical characteristic of the storage medium, changing an electrical or electronic characteristic of the storage medium, or changing any other characteristic of the storage medium.

In these alternative embodiments, a probe 14 is used to form at least first and second structures on a storage medium, where a storage cell having a transition between the first and second structures contains a data bit having a first storage state. On the other hand, a storage cell that does not have a transition between the first and second structures contains a data bit having a second storage state.

Figure 4:
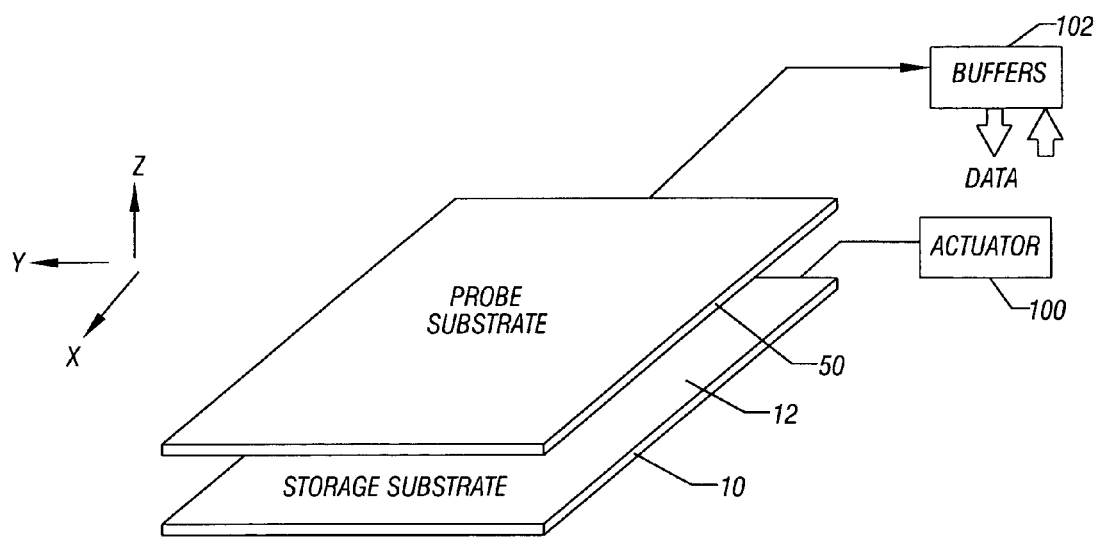
FIG. 4 illustrates the probe substrate positioned to face the storage substrate in the probe-based storage device of FIG. 1.

As shown in FIGS. 1 and 4, the probe substrate 50 is placed with the surface containing the probes 14 facing the storage surface 12 of the storage substrate 10, on which the storage cells are formed. The probe substrate 50 is positioned over the storage substrate 10 so that the probe tips 18 (FIG. 1) of the probes 14 point downwardly to engage the storage surface 12 of the storage substrate 10. In an alternative arrangement, the storage substrate 10 is positioned over the probe substrate 50 so that the probe tips 18 point upwardly to face the storage surface 12. In other arrangements, the probe substrate 50 and the storage substrate 10 can have a side-to-side relationship.

The storage substrate 10, in the example of FIG. 4, is coupled to an actuator 100 that is designed to move the storage substrate 10 in both X and Y directions such that probes 14 (FIG. 1) can be placed over desired storage cells on the storage substrate 10. Data sensed by the probes 16 is provided to buffers 102, which store output data for retrieval by an external device. The buffers 102 may also store write data to be written to storage cells 22 (FIG. 1) in the storage substrate 10.

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 5:
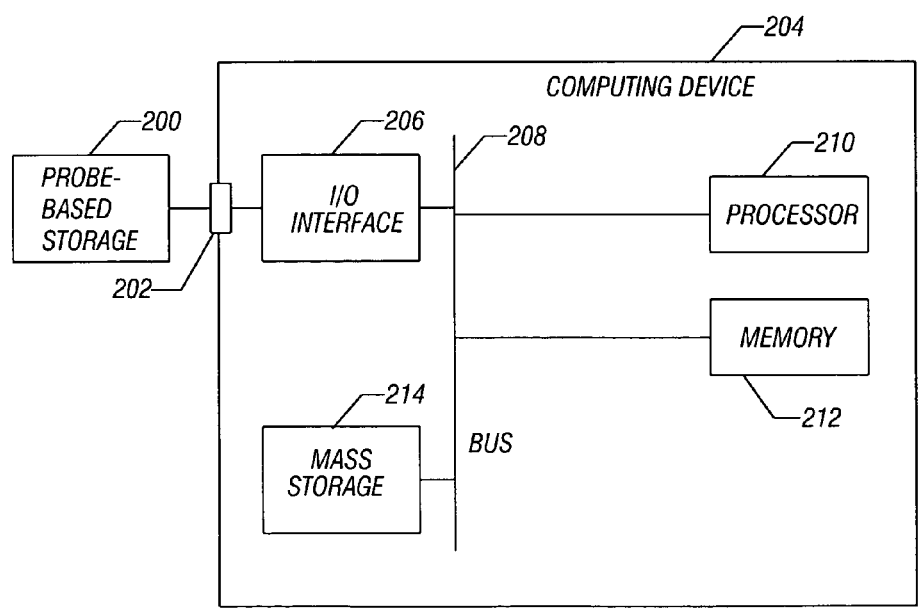
FIG. 5 is a block diagram of a system that includes a computing device having a port to connect to a probe-based storage device that incorporates an embodiment of the invention.

The probe-based storage device according to some embodiments can be packaged for use in a computing system. For example, as shown in FIG. 5, a probe-based storage device 200 that incorporates an embodiment of the invention is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
   a storage medium having a plurality of storage cells;
   a probe to read from and write to the storage cells,
   wherein the storage medium includes a first structure and second structure,
   wherein a first storage cell containing a transition between the first structure and the second structure contains a data bit having a first state,
   wherein a second storage cell including the first structure but not including a transition between the first structure and the second structure contains a data bit having a second state, and
   wherein a third storage cell including the second structure but not including a transition between the first structure and the second structure contains a data bit having the second state.

2. The storage device of claim 1, wherein the first structure comprises a trench, and the second structure comprises a surface of the storage medium.

3. The storage device of claim 1, wherein the first structure has a different physical characteristic than the second structure.

4. The storage device of claim 1, wherein the first structure has a different chemical characteristic than the second structure.

5. The storage device of claim 1, wherein the first structure has a different electronic characteristic than the second structure.

6. The storage device of claim 1, wherein the probe comprises a nanotechnology probe.

7. A system comprising:
   a processor; and
   a storage device coupled to the processor, the storage device comprising:
   a probe;
   a storage medium having a storage surface, the probe to form a trench in the storage medium, wherein a transition between the trench and the storage surface represents a first storage state, and wherein lack of a transition between the trench and the storage surface represents a second different storage state, wherein the storage medium includes storage cells including:
     a first storage cell located in a first region containing a first end of the trench;
     a second storage cell located in a second region containing a second end of the trench, each of the first and second ends constituting a transition;
     a third storage cell located in a third region containing a portion of the trench without presence of the storage surface; and
     a fourth storage cell located in a fourth region containing a portion of the storage surface of the storage medium away from the trench,
     wherein each of the first and second storage cells stores a respective data bit having the first storage state, and each of the third and fourth storage cells stores a respective data bit having the second storage state.

8. The system of claim 7, further comprising read circuitry to detect engagement of the probe with a transition between the trench and the storage surface.

9. The system of claim 8, wherein the probe has a tip, the probe tip and the storage medium moveable with respect to each other to enable the probe tip to engage the storage surface, the trench, and any transition between the trench and the storage surface.

10. The system of claim 9, wherein the probe tip is adapted to form the trench during a write operation.

11. The system of claim 10, wherein the probe tip is adapted to form a second trench in the storage medium during the write operation, a transition between the second trench and the storage surface to represent the first storage state.

12. The system of claim 7, further comprising:
    an encoder to encode input data to produce encoded data to reduce a number of transitions between the first and second storage states in a sequence of storage cells; and
    write circuitry to cause the probe to write the encoded data to the storage medium by forming at least the trenches in the storage medium.

13. The system of claim 12, wherein the encoding performed by the encoder causes each of the trenches to have greater than a predetermined length.

14. A method of storing data in a storage device, comprising:
    forming, with a probe, a first structure in a storage medium, the storage medium further comprising a second structure;
    indicating a first data state in response to detecting a transition between the first structure and the second structure in a first storage cell; and
    indicating a second data state in response to detecting lack of transition between the first structure and the second structure in a second storage cell, wherein the second storage cell contains the first structure but not the second structure; and
    indicating the second data state in response to detecting lack of transition between the first structure and the second structure in a third storage cell, wherein the third storage cell contains the second structure but not the first structure.

15. The method of claim 14, wherein the first structure comprises a trench, and the second structure comprises a surface of the storage medium,
    wherein forming the trench comprises heating a temperature of a tip of the probe to greater than a write temperature to cause a portion of the storage medium to melt.

16. The method of claim 15, wherein detecting a transition comprises detecting a transition between the trench and the surface of the storage medium.

17. The method of claim 15, further comprising:
    receiving input write data;
    encoding the input write data to produce encoded write data; and
    writing the encoded write data to storage cells of the storage medium instead of the input write data,
    wherein writing the encoded write data to the storage cells comprises writing variable length trenches in the storage medium.

18. The storage device of claim 1, further comprising:
    a read circuit to produce a first indication in response to the probe being engaged with the first structure, and to produce a second indication in response to the probe being engaged with the second structure, the read circuit to:
indicate that the first storage cell has the first state in response to detecting a change from the first indication to the second indication,
indicate that the second storage cell has the second state in response to detecting the first indication associated with the second storage cell without detecting the second indication associated with the second storage cell, and
indicate that the third storage cell has the second state in response to detecting the second indication associated with the third storage cell without detecting the first indication associated with the third storage cell.

19. The storage device of claim 18, wherein the read circuit comprises:
a sensing device coupled to the probe,
the sensing device to produce the first and second indications, and
a decoder to receive the first and second indications from the sensing device to provide outputs indicating states of storage cells.

20. The system of claim 7, wherein the storage device further comprises:
a read circuit to produce a first indication in response to the probe being engaged with the trench, and to produce a second indication in response to the probe being engaged with the storage surface away from the trench, the read circuit to:
indicate that the first and second storage cells store respective data bits having the first storage state in response to detecting a change between the first indication and the second indication,
indicate that the third storage cell has the second storage state in response to detecting the first indication associated with the third storage cell without detecting the second indication associated with the third storage cell, and
indicate that the fourth storage cell has the second storage state in response to detecting the second indication associated with the fourth storage cell without detecting the first indication associated with the fourth storage cell.

* * * * *